(12) United States Patent
Menegoli et al.

(10) Patent No.: US 10,389,162 B2
(45) Date of Patent: Aug. 20, 2019

(54) POWER RECEIVING UNIT REFLECTED REACTANCE AND TUNING METHODS

(71) Applicant: QUALCOMM Incorporated, San Diego, CA (US)

(72) Inventors: Paolo Menegoli, San Jose, CA (US); Mark White, II, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 15/599,520

(22) Filed: May 19, 2017

(65) Prior Publication Data

US 2018/0337547 A1 Nov. 22, 2018

(51) Int. Cl.
*H02J 7/00* (2006.01)
*H02J 7/02* (2016.01)
*H02J 50/12* (2016.01)
*H02J 50/70* (2016.01)
*H02J 50/40* (2016.01)
*H02J 50/80* (2016.01)

(52) U.S. Cl.
CPC ............ *H02J 7/025* (2013.01); *H02J 7/0027* (2013.01); *H02J 7/0044* (2013.01); *H02J 50/12* (2016.02); *H02J 50/40* (2016.02); *H02J 50/70* (2016.02); *H02J 50/80* (2016.02); *H02J 2007/0095* (2013.01)

(58) Field of Classification Search
CPC .............................. H02J 7/025; H02J 7/0027
USPC .......................................................... 320/108
See application file for complete search history.

(56) References Cited

U.S. PATENT DOCUMENTS 9,939,841 B1 * 4/2018 Dusatko ................... G06F 1/10
2007/0109708 A1   5/2007 Hussman et al.
(Continued)

FOREIGN PATENT DOCUMENTS

WO   2015112029 A1   7/2015
WO   2016032981 A1   3/2016
WO   2016160234 A1   10/2016

OTHER PUBLICATIONS

International Search Report and Written Opinion—PCT/US2018/028063—ISA/EPO—Jul. 20, 2018 (162205WO).
(Continued)

*Primary Examiner* — Suchin Parihar
(74) *Attorney, Agent, or Firm* — Hunter Clark PLLC

(57) ABSTRACT

Techniques for reducing reflected reactance in a wireless power transfer system are provided. An example apparatus includes a resonant network including a variable reactance element, such that the resonant network is configured to resonant when the variable reactance element is at a resonant reactance value, a control circuit operably coupled to the variable reactance element and configured to determine a first reactance value and a second reactance value, such that an output of the PRU is the desired output when the variable reactance element is either the first reactance value or the second reactance value, and the first reactance value is below the resonant reactance value and the second reactance value is above the resonant reactance value, determine an indication of a source reactance associated with a wireless power source, and adjust the variable reactance element to either the first reactance value or the second reactance value based on the indication of the source reactance.

30 Claims, 9 Drawing Sheets

(56) References Cited

U.S. PATENT DOCUMENTS

| | | | |
|---|---|---|---|
| 2011/0053500 A1 | 3/2011 | Menegoli et al. | |
| 2011/0221277 A1 | 9/2011 | Boys | |
| 2013/0222075 A1* | 8/2013 | Reedy | H03J 3/20 333/32 |
| 2013/0241625 A1* | 9/2013 | Perreault | H03F 1/0294 327/355 |
| 2015/0035377 A1* | 2/2015 | James | H02J 3/1864 307/104 |
| 2015/0365052 A1* | 12/2015 | Barton | H03F 1/56 330/295 |
| 2016/0181986 A1* | 6/2016 | Perreault | H03F 3/2176 330/251 |
| 2018/0219423 A1* | 8/2018 | Maunder | H02J 50/12 |
| 2018/0337547 A1* | 11/2018 | Menegoli | H02J 7/025 |
| 2019/0123735 A1* | 4/2019 | Reedy | H03J 3/20 |

OTHER PUBLICATIONS

Lim Y., et al., "An Adaptive Impedance-Matching Network Based on a Novel Capacitor Matrix for Wireless Power Transfer", IEEE Transactions on Power Electronics, vol. 29, No. 8, pp. 4403-4413, Aug. 1, 2014 (Aug. 1, 2014), XP011544103, DOI: 10.1109/TPEL.2013.2292596.

* cited by examiner

POWER RECEIVING UNIT REFLECTED REACTANCE AND TUNING METHODS

FIELD

This application is generally related to wireless power charging of chargeable devices, and more particularly to controlling the reflected reactance generated in a wireless power receiver by varying the reactance of a resonant network.

BACKGROUND

A variety of electrical and electronic devices are powered via rechargeable batteries. Such devices include electric vehicles, mobile phones, portable music players, laptop computers, tablet computers, computer peripheral devices, communication devices (e.g., Bluetooth devices), digital cameras, hearing aids, and the like. Historically, rechargeable devices have been charged via wired connections through cables or other similar connectors that are physically connected to a power supply. More recently, wireless charging systems are being used to transfer power in free space to be used to charge rechargeable electronic devices or provide power to electronic devices. Many wireless charging systems enable charging multiple electronic devices with a single charging pad. A sudden change in the number of devices may impact the amplifier circuits in the charging pad and lead to unstable charging operations. As such, wireless power transfer systems and methods that efficiently control and safely transfer power to one or more electronic devices are desirable.

SUMMARY

An example of an apparatus for providing a desired output from a power receiving unit in a wireless power transfer system according to the disclosure includes a resonant network including a variable reactance element, such that the resonant network is configured to resonant when the variable reactance element is at a resonant reactance value, a control circuit operably coupled to the variable reactance element and configured to determine a first reactance value and a second reactance value, such that an output of the power receiving unit is the desired output when the variable reactance element is either the first reactance value or the second reactance value, and the first reactance value is below the resonant reactance value and the second reactance value is above the resonant reactance value, determine an indication of a source reactance associated with a wireless power source, and adjust the variable reactance element to either the first reactance value or the second reactance value based on the indication of the source reactance.

Implementations of such an apparatus may include one or more of the following features. The control circuit may be configured to receive an information element from the wireless power source (e.g., a power transmitting unit (PTU)) and to determine the indication of the source reactance based on the information element. The information element may be a single bit. The control circuit may include a look-up-table to determine the indication of the source reactance. A reactance measuring circuit may be configured to determine the indication of the source reactance. The variable reactance element may include at least one variable capacitor. The variable reactance element may include a plurality of capacitors and at least one switch operably coupled to the control circuit. The control circuit may be configured to receive a communication signal and adjust the variable reactance element to either the first reactance value or the second reactance value based on the communication signal. The power receiving unit may include at least one coil configured to inductively couple power via a magnetic field. The resonant network may be capacitive when the variable reactance element is at the first reactance value. The resonant network may be inductive when the variable reactance element is at the second reactance value. The indication of the source reactance may indicate a reflected reactance measured in the wireless power source is inductive and the control circuit may be configured to adjust the variable reactance element to the second reactance value. The indication of the source reactance may indicate a reflected reactance measured in the wireless power source is capacitive and the control circuit may be configured to adjust the variable reactance element to the first reactance value.

An example of a method of reducing reflected reactance in a wireless power transfer system according to the disclosure includes regulating an output of a power receiving unit, such that the power receiving unit includes a resonant circuit and the output is regulated to a desired output based on a variable reactance element in the resonant circuit, determining a first reactance value and a second reactance value, such that the output of the power receiving unit is the desired output when the variable reactance element is either the first reactance value or the second reactance value, and the first reactance value is below a resonant reactance value and the second reactance value is above the resonant reactance value, determining an indication of a source reactance associated with a wireless power source, and adjusting the variable reactance element to either the first reactance value or the second reactance value based on the indication of the source reactance.

Implementations of such a method may include one or more of the following features. An information element may be received from the wireless power source and the indication of the source reactance may be determined based on the information element. The information element may be a single bit. The indication of the source reactance may include querying a look-up-table. Determining the indication of the source reactance may include measuring a reactance of the resonant circuit with a reactance measuring circuit. Adjusting the variable reactance element may include providing a control signal to at least one variable capacitor. Adjusting the variable reactance element may include providing a control signal to at least one switch operably coupled to a plurality of capacitors in the resonant circuit. The output of the power receiving unit may be reduced to a nominal value prior to adjusting the variable reactance element. A communication signal may be received and the variable reactance element may be adjusted to either the first reactance value or the second reactance value based on the communication signal. The resonant circuit may be capacitive when the variable reactance element is at the first reactance value. The resonant circuit may be inductive when the variable reactance element is at the second reactance value. The method may include determining that the indication of the source reactance indicates a reflected reactance measured in the wireless power source is inductive, and adjusting the variable reactance element to the second reactance value. The method may also include determining that the indication of the source reactance may indicate a reflected reactance measured in the wireless power source is capacitive, and adjusting the variable reactance element to the first reactance value.

An example of an apparatus for reducing reflected reactance in a wireless power transfer system according to the disclosure includes means for varying a reactance of a power receiving unit, means for determining a first reactance value and a second reactance value, such that an output of the power receiving unit is a desired output when the reactance of the power receiving unit is either the first reactance value or the second reactance value, and the first reactance value is below a resonant reactance value and the second reactance value is above the resonant reactance value, means for determining an indication of a source reactance associated with a wireless power source, and means for adjusting the reactance of the power receiving unit to either the first reactance value or the second reactance value based on the indication of the source reactance.

An example of a non-transitory processor-readable storage medium according to the disclosure comprises processor-readable instructions configured to cause at least one processor to reduce reflected reactance in a wireless power transfer system, and includes code for regulating an output of a power receiving unit, wherein the power receiving unit includes a resonant circuit and the output is regulated to a desired output based on a variable reactance element in the resonant circuit, code for determining a first reactance value and a second reactance value, such that the output of the power receiving unit is the desired output when the variable reactance element is either the first reactance value or the second reactance value, and the first reactance value is below a resonant reactance value and the second reactance value is above the resonant reactance value, code for determining an indication of a source reactance associated with a wireless power source, and code for adjusting the variable reactance element to either the first reactance value or the second reactance value based on the indication of the source reactance.

Implementations of such a storage medium may include one or more of the following features. Code for receiving an information element from a power transmitting unit and code for determining the indication of the source reactance based on the information element. The code for adjusting the variable reactance element may include code for providing a control signal to at least one variable capacitor.

Items and/or techniques described herein may provide one or more of the following capabilities, as well as other capabilities not mentioned. A power transmitting unit (PTU) may provide a time-varying field to one or more power receiving units (PRUs). The PRUs utilize resonant circuits to transform the time-varying field to a desired output (e.g., voltage/current/power). The PRUs may generate a reflected reactance in the PTU. High levels of reflected reactance may damage the amplifier circuits in the PTU. The PTU may be configured to detect the reflected reactance and provide a signal to one or more of the PRUs. The PRUs may utilize the signal to change the reactance of a resonant network from a below resonance behavior to an above resonance behavior. The change in reactance in the resonant network may be realized using one or more variable reactance elements. Both the above and below resonance behavior will enable the desired output. The PRUs may autonomously determine an estimated reflected reactance in the PTU and adjust the resonance behavior accordingly. Charging operation may be paused while the value of a variable reactance element is being changed. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Techniques are discussed herein for wireless power transfer using resonant circuits. Wireless power transfer may refer to transferring any form of energy associated with electric fields, magnetic fields, electromagnetic fields, or otherwise from a wireless power source (e.g., a transmitter) to a wireless power receiver (e.g. a receiver) without physical electrical conductors attached to and connecting the transmitter to the receiver to deliver the power (e.g., power may be transferred through free space). The power output into a wireless field (e.g., a magnetic field or an electromagnetic field) may be received, captured by, or coupled to by a power receiving element to achieve power transfer. The transmitter transfers power to the receiver through a wireless coupling of the transmitter and receiver.

The output power of a receiver in a wireless power transfer may be regulated by varying the reactance of a resonant network (i.e., resonant circuit) within the receiver. In an example, tuning the resonant network closer to resonance or further away from resonance may be used to control the output power efficiently. In some implementations the tuning may allow controlling the output power without using DC-DC power converters fed by a rectifier in the receiver. One approach to changing and controlling the reactance in a resonant network includes varying the value of one or more capacitive elements in the resonant network. Switched capacitors and variable capacitors may be used in some applications to change the reactance of a circuit.

Variations of the resonant network reactance in a wireless receiver may also impact the operation of the wireless transmitter (e.g., a Power Transmitting Unit (PTU)). The variations may increase or decrease the reflected reactance within the transmitter. In general, a wireless transmitter designed includes a class-E amplifier configured to drive a resonant network at an output coil (e.g., antenna). When the reflected reactance remains within a specified range of values, the amplifier will operate efficiently. When the reactance as seen by the transmitter varies significantly, however, a tuning network in the transmitter may be required in order to prevent high power dissipation in the amplifier and/or undesired amplitude modulation (AM) of the signal.

Figure 1:
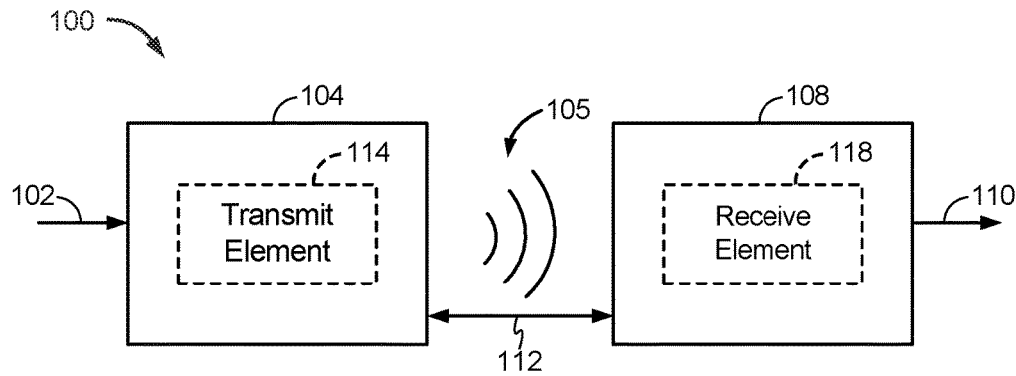
FIG. 1 is a functional block diagram of an exemplary wireless power transfer system.

FIG. 1 is a functional block diagram of an example of a wireless power transfer system 100. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) that is coupled to receive the output power 110. The transmitter 104 and the receiver 108 are separated by a non-zero distance 112. The transmitter 104 includes a power transmitting element 114 configured to transmit/couple energy to the receiver 108. The receiver 108 includes a power receiving element 118 configured to receive or capture/couple energy transmitted from the transmitter 104.

The transmitter 104 and the receiver 108 may be configured according to a mutual resonant relationship. When the resonant frequency of the receiver 108 and the resonant frequency of the transmitter 104 are substantially the same, transmission losses between the transmitter 104 and the receiver 108 are reduced compared to the resonant frequencies not being substantially the same. As such, wireless power transfer may be provided over larger distances when the resonant frequencies are substantially the same. Resonant inductive coupling techniques allow for improved efficiency and power transfer over various distances and with a variety of inductive power transmitting and receiving element configurations.

The wireless field 105 may correspond to the near field of the transmitter 104. The near field corresponds to a region in which there are strong reactive fields resulting from currents and charges in the power transmitting element 114 that do not significantly radiate power away from the power transmitting element 114. The near field may correspond to a region that up to about one wavelength, of the power transmitting element 114. Efficient energy transfer may occur by coupling a large portion of the energy in the wireless field 105 to the power receiving element 118 rather than propagating most of the energy in an electromagnetic wave to the far field.

The transmitter 104 may output a time-varying magnetic (or electromagnetic) field with a frequency corresponding to the resonant frequency of the power transmitting element 114. When the receiver 108 is within the wireless field 105, the time-varying magnetic (or electromagnetic) field may induce a current in the power receiving element 118. As described above, with the power receiving element 118 configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge an energy storage device (e.g., a battery) or to power a load.

Figure 2:
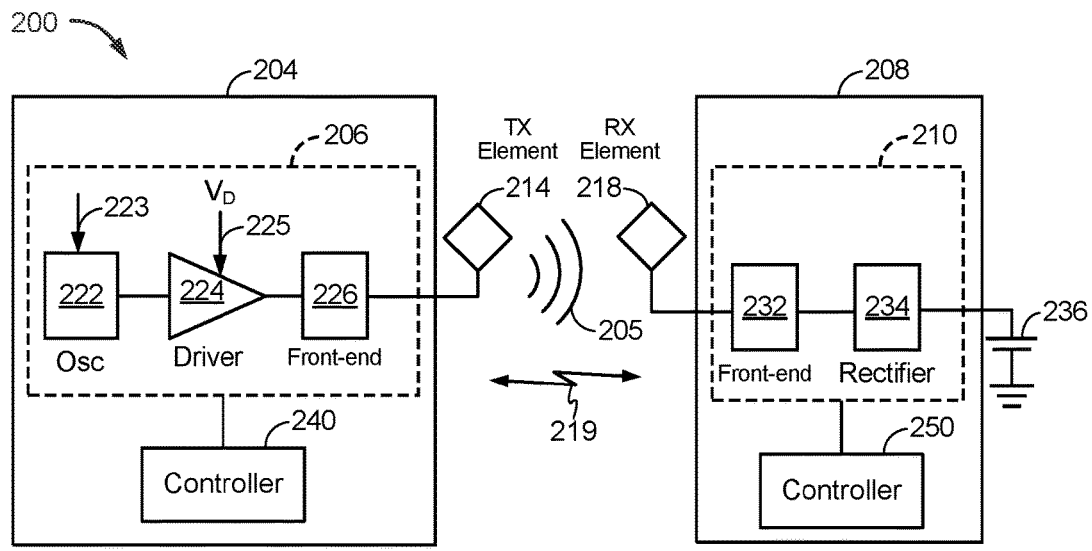
FIG. 2 is a functional block diagram of an example of another wireless power transfer system.

FIG. 2 is a functional block diagram of an example of a wireless power transfer system 200. The system 200 includes a transmitter 204 and a receiver 208. The transmitter 204 (e.g., PTU) is configured to provide power to a power transmitting element 214 that is configured to transmit power wirelessly to a power receiving element 218 that is configured to receive power from the power transmitting element 214 and to provide power to the receiver 208. Despite their names, the power transmitting element 214 and the power transmitting element 218, being passive elements, may transmit and receive power and communications.

The transmitter 204 includes the power transmitting element 214, transmit circuitry 206 that includes an oscillator 222, a driver circuit 224, and a front-end circuit 226. The power transmitting element 214 is shown outside the transmitter 204 to facilitate illustration of wireless power transfer using the power transmitting element 218. The oscillator 222 may be configured to generate an oscillator signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a class-E amplifier or other amplifier (e.g., configured to receive a square wave from the oscillator 222 and output a sine wave).

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or powering a load.

The transmitter 204 further includes a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by the controller 240. The transmitter 204 may further include a memory (not shown) configured to store data, for example, such as instructions for causing the controller 240 to perform particular functions, such as those related to management of wireless power transfer.

Figure 3:
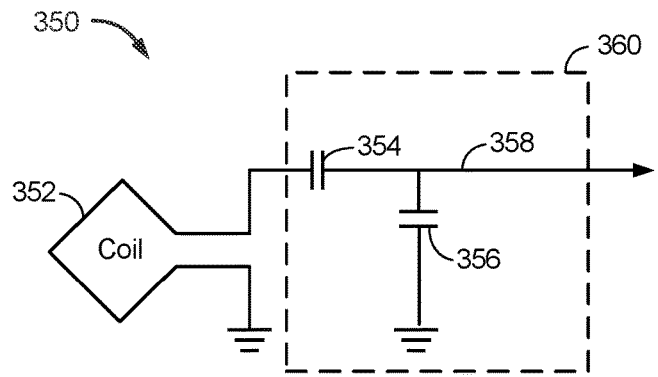
FIG. 3 is a schematic diagram of a portion of transmit circuitry or receive circuitry of FIG. 2 including a transmit or receive element.

The receiver 208 (e.g., a wireless power receiving unit (PRU)) includes the power receiving element 218, and receive circuitry 210 that includes a front-end circuit 232 and a rectifier circuit 234. The power receiving element 218 is shown outside the receiver 208 to facilitate illustration of wireless power transfer using the power receiving element 218. The front-end circuit 232 may include matching circuitry configured to match the impedance of the receive circuitry 210 to the impedance of the power receiving element 218. As will be explained below, the front-end circuit 232 may further include a tuning circuit to create a resonant circuit within the power receiving element 218. The rectifier circuit 234 may generate a DC power output from an AC power input to charge the battery 236, as shown in FIG. 3. The receiver 208 and the transmitter 204 may additionally communicate on a separate communication channel 219 (e.g., BLUETOOTH, ZIGBEE, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. The transmitter 204 may be configured to generate a predominantly non-radiative field with a direct field coupling coefficient (k) for providing energy transfer. The receiver 208 may directly couple to the wireless field 205 and generate an output power for storing or consumption by a battery (or load) 236 coupled to the output or receive circuitry 210. In this example, the generated output power is associated with the resonant circuit in the front end 232 because the tuning of the resonant circuit will impact the amount of output power generated.

The receiver 208 further includes a controller 250 that may be configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to try to minimize transmission losses between the transmitter 204 and the receiver 208.

FIG. 3 is a schematic diagram of an example of a portion of the transmit circuitry 206 or the receive circuitry 210 of FIG. 2. While a coil, and thus an inductive system, is shown in FIG. 3, other types of systems, such as capacitive systems for coupling power, may be used, with the coil replaced with an appropriate power transfer (e.g., transmit and/or receive) element. As illustrated in FIG. 3, transmit or receive circuitry 350 includes a power transmitting or receiving element 352 and a tuning circuit 360. The power transmitting or receiving element 352 may also be referred to or be configured as an antenna such as a "loop" antenna. The term "antenna" generally refers to a component that may wirelessly output energy for reception by another antenna and that may receive wireless energy from another antenna. The power transmitting or receiving element 352 may also be referred to herein or be configured as a "magnetic" antenna, such as an induction coil (as shown), a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non-limiting example, the tuning circuit 360 may comprise a capacitor 354 and a capacitor 356, which may be added to the transmit or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. For example, the tuning circuit in the front-end circuit 226 may have the same design (e.g., 360) as the tuning circuit in the front-end circuit 232. Alternatively, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, persons of ordinary skill will appreciate that aspects disclosed herein may be used in non-resonant implementations for wireless power transfer.

Figure 4:
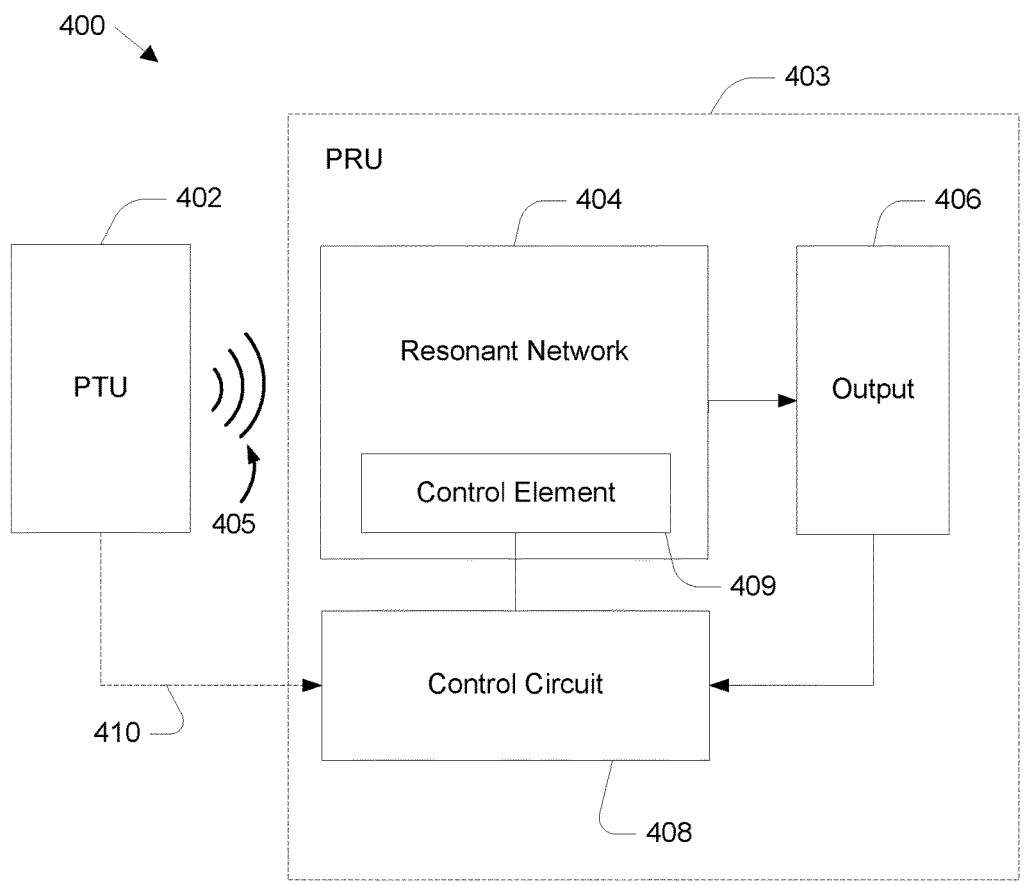
FIG. 4 is a diagram of a wireless power transfer system with a control loop on the receive circuitry.

Referring to FIG. 4, a diagram of an exemplary wireless power transfer system 400 with a control loop on the receive circuitry is shown. The system 400 includes a PTU 402 and a PRU 403. The PRU 403 includes a resonant network 404 with a control element 409. The PTU 402 is an example of a wireless power source and is configured to output a time-varying field 405 (e.g., magnetic or electromagnetic) such as described for the transmit element 214. The PTU 402 may also provide a separate communication channel 410 (e.g., BLUETOOTH, ZIGBEE, cellular, etc.). The resonant network 404 may part of the front end 232 and the output 406 may receive an AC signal which is associated with the tuning of the resonant network 404. The output 406, for example, may be rectified (e.g., via rectifier 234) for use in power applications (e.g., battery charging with a charge controller). In an example, the output 406 may be an impedance matching device (e.g., antenna matching in a communication system). A control circuit 408 may be part of the controller 250 and is operably coupled to the output 406 and the control element 409. The resonant network 404 comprises a resonant circuit with one or more variable reactance elements (e.g., switched capacitors, tuning capacitors, transcaps, variable capacitors, varactors, etc.). The control circuit 408 is configured to detune the resonant network 404 away from resonance or tune the resonant network 404 closer to resonance by providing a control signal to the control element 409. The control circuit 408 may be a micro-controller or a processor unit with at least one processor and one or more memory units. In an example, the control circuit 408 may be implemented as an application-specific integrated circuit (ASIC). The control element 409 may be operably coupled to the variable reactance elements and configured to change the capacitive values of the elements via one or more signals such as analog control signals (e.g., a voltages). For example, the control circuit 408 may detect feedback parameter on the output 406 (e.g., a current, a voltage, a standing wave ratio, or other parameter), generate a control signal based on the feedback signal, and provide the control signal to the control element 409 to detune or tune the resonant network 404 based on the value of the output 406. The control circuit 408 may also receive information from the PTU 402 via the communication channel 410 to generate a control signal.

In operation, the control circuit 408 is configured to generate a control signal in response to an increase in the actual or expected reflected impedance/reactance as seen by the PTU 402. As depicted in FIG. 2, the driver circuit 224 typically includes an amplifier (e.g., a class-E amplifier) which drives the transmit element 214 with a signal. The tolerance of the driver circuit 224 to an increase in the reactance within the PRU 403 may vary based on the power levels generated by the PTU 402. In general, the reactance seen by a class-E amplifier is preferred to be maintained within a range contemplated by the amplifier design. In some implementations, the PTU 402 may be configured with adjustable tuning, however, the tunable range may be limited and may significantly increase the costs and complexity of the PTU 402. In either case, if the reactance values exceed the designed range for the amplifier, then the PTU 402 may operate in an undesired manner. For example, the power dissipation of the driver circuit 224 may increase and cause the device to generate heat which wastes power and may cause damage to the circuit. In particular, if the reactance as seen by the PTU 402 becomes too inductive (e.g., impedance increases with the frequency), then the amplifier in the driver circuit 224 could suffer a catastrophic failure (i.e., explode). Other negative effects of reflected reactance are also possible. The reflected reactance may cause the time-varying field 405 to become AM modulated. The control circuit 408 may be configured to maintain the impedance/reactance seen by the PTU 402 within a certain range of values.

Generally, the reactance seen by the PTU 402 is reflected from the PRU 403 because the reactance of the resonant network 404 in the PRU 403 is reflected back to the PTU 402 as a different reactance. Reflected reactance (Xrefl) may be described by the following equation:

$$X_{refl} = \frac{-X(\omega M)^2}{(R^2 + X^2)}$$

where:
X is the reactance seen by the PRU source;
ω is the frequency;
M is the mutual inductance; and
R is the resistance seen by the PRU source.

As indicated in the formula, a minus sign is applied to the reactance as seen by the PRU 403. This minus sign means that if the reactance as seen by the PRU 403 is a capacitive type, then the reflected reactance (i.e., as seen by the PTU 402) becomes inductive. This also means that if the reactance as seen by the PRU 403 is an inductive type, then the reflected reactance seen by the PTU 402 becomes a capacitive type. The increase in reflected reactance at the PTU becomes more important in a system where there may be multiple PRUs for a single PTU. In such cases, the reactance seen by the PTU may be equal to the sum of the impedances as seen by the PRUs. For example, if three PRUs are placed on a PTU then the reactance seen by the PTU is approximately the sum of the three. The presence of the three PRUs and the corresponding increase in reflected reactance may approach the limit of the acceptable operational range of the amplifier and may push the amplifier to a critical fault (e.g., by operating outside of the amplifier's designed range). To correct this situation, the PRU 403 may be configured to modify the reactance in resonant network 404 to operate in areas that are either above or below resonance. As will be described, the control element 409 in the resonant network 404 is configured to operate on either the inductive or capacitive sides of the resonant circuit output bell curve.

Figure 5:
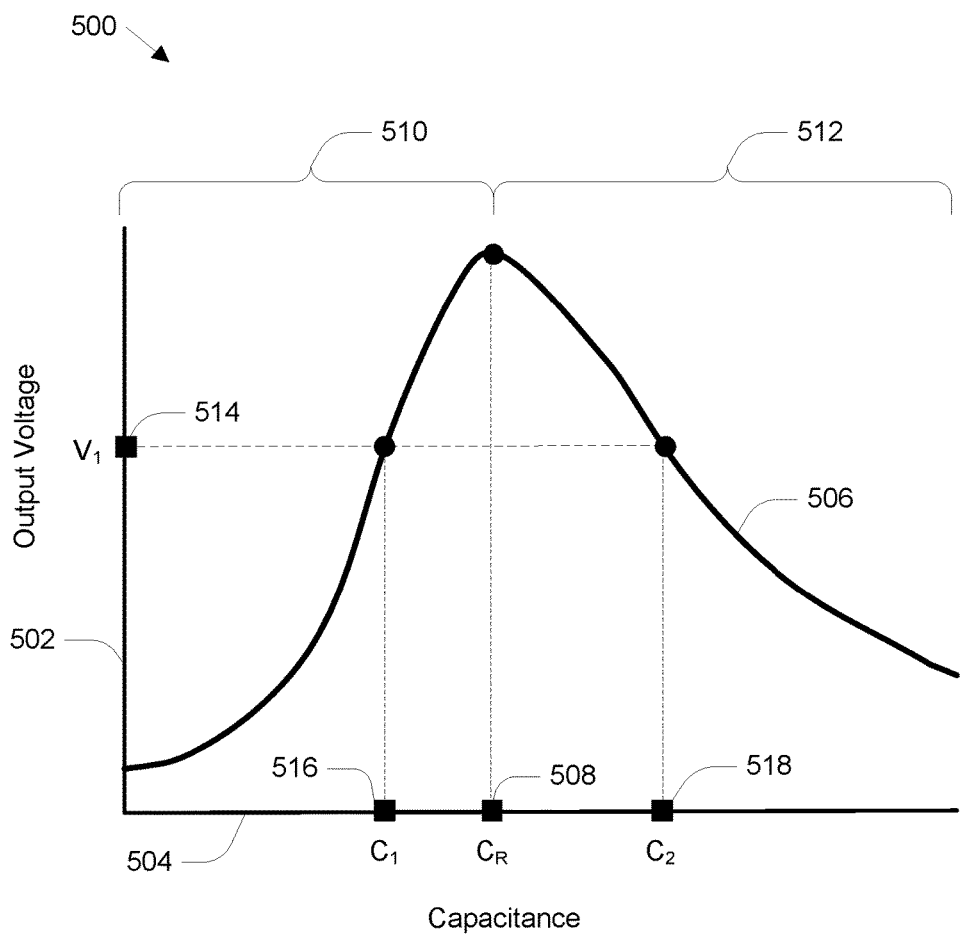
FIG. 5 is a graphic representation of regulating an output based on a reactance value of a resonant circuit.

Referring to FIG. 5, with further reference to FIG. 4, a graph 500 representing the regulation of an output based on a reactance value of a resonant circuit is shown. The resonant circuit may be the resonant network 404 in the PRU 403 depicted in FIG. 4. The graph 500 includes an output voltage axis 502, a capacitance axis 504, and an output bell curve 506. The output bell curve 506 indicates the output power versus the reactance of the control element 409 (e.g., the value of a variable capacitor). The peak output voltage occurs when the resonant network 404 is operating at resonance, which occurs when the control element 409 is operating at the resonant capacitance ($C_R$) 508. The control element 409 may be configured to change its reactance value such that the resonant network 404 may operate in a below resonance area 510 (i.e., to the left of the resonant peak), or in an above resonance area 512 (i.e., the right of the resonant peak). The resonant network 404 may provide a desired output voltage $V_1$ 514 by operating on either the left or the right side of the output bell curve 506 (e.g., by operating above or below resonance). While operating on the left side (i.e., the below resonance area 510), the resonant network 404 is capacitive, and while operating on the right side (i.e., the above resonance area 512), the resonant network 404 is inductive. As illustrated in FIG. 5, the desired output 514 may be realized when the control element 409 is providing a first capacitance $C_1$ 516 or a second capacitance $C_2$ 518. Thus, the desired output 514 may be achieved when the resonant network 404 has either capacitive or inductive behavior. When the PRU 403 is operating with capacitive behavior (e.g., the first capacitance 516), the reflected reactance at the PTU 402 is more inductive, and when the PRU 403 is operating with inductive behavior (e.g., the second capacitance 518), the reflective reactance at the PTU 402 is capacitive.

In operation, the resonant network 404 may be configured to regulate output power by operating in the below resonance area 510 (e.g., may allow for smaller value of capacitance, increase receive efficiency). In this case, since the PRU 403 is operating below resonance (i.e., with capacitive behavior) the PTU 402 will see an inductive reactance. If there are multiple PRUs operating with capacitive behavior on the PTU 402, the capacitive reactance may push the PTU 402 out of the operational range of the amplifier. The reflected reactance at the PTU 402 may be modified by changing the operation of one or more of the PRUs from the left side to the right side of the output bell curve 506. For example, the control element 409 may be configured to change from the first capacitance 516 to the second capacitance 518. As a result, a PRU will maintain the desired output 514 while the inductive reactance as seen by the PTU 402 is reduced. A wireless power transfer system may be designed to select operation on either side of the output bell curve 506 based on a specific application of the system. For example, the system may adaptively switch operation from one side to the other based on the detection of another PRU which may simultaneously compete for power.

Figure 6:
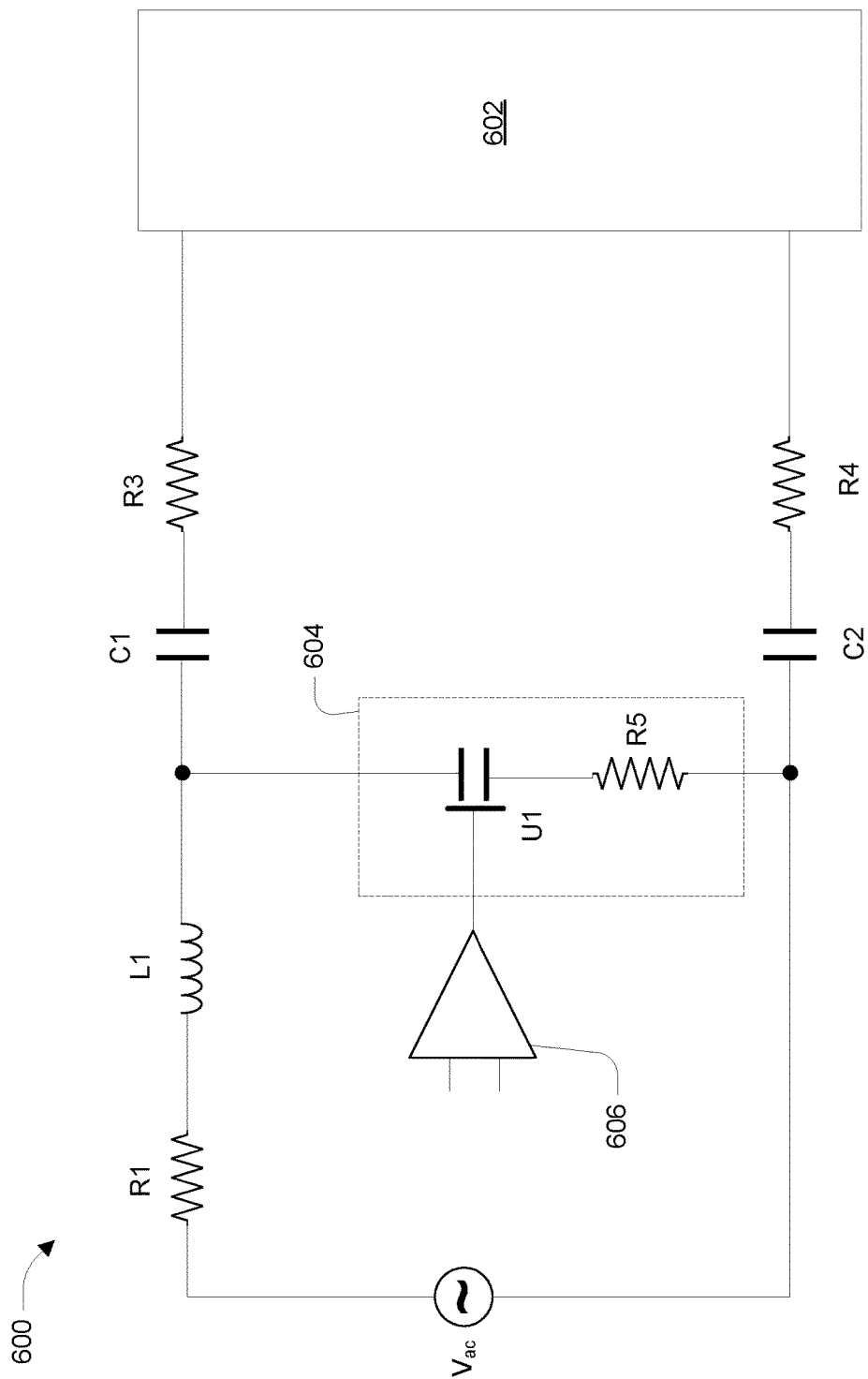
FIG. 6 is a diagram of an example of a resonant network with a variable reactance element.

Referring to FIG. 6, a diagram of an exemplary resonant network 600 with a variable reactance element is shown. The resonant network 600 is an example of the resonant network 404 in the PRU 403 and is operably coupled to an output circuit 602. The resonant network 600 may include at least one coil L1 configured to inductively couple power via a magnetic field. The output circuit 602 may include additional application specific circuity such as EMI filters, rectifiers, and other output circuits in the PRU 403 (not shown). While resonant network 600 is an example of a resonant circuit in a shunt configuration, the resonant network 600 is not so limited. Series networks as well as other resonant network topologies may be used. A voltage generator $V_{ac}$ simulates an induced voltage (e.g., the voltage that is induced into the resonant network from PTU 402 via at least one coil L1). R1 represents a series resistance and L1 represents the inductance of the at least one coil (e.g., antenna/receiving element 352). The values of the discrete components in the resonant network will vary based on specific application and required performance (e.g., power output). A charging solution for a small consumer product, for example, may utilize values of R1 is in a range between 500-1000 milliohms, and L1 may be in a range between 500-1000 nanohenries. The resonant network 600 includes a variable reactance element 604 in a shunt configuration. Examples of the variable reactance element 604 include a transcap, analog variable capacitor technologies, switched capacitors, varactors, combinations of varactors, and Barium-Strontium Titanate (BST) dielectrics/devices. The variable reactance element 604 may vary its reactance in a continuous fashion. In an example, the variable reactance element 604 may include at least one variable capacitor U1 with a common control terminal operably coupled to an operational amplifier 606. A resistance R5 represents the internal resistance of the variable reactance element 604, and may have a value in the range of 10-100 milliohms. The variable capacitor U1 may be a semiconductor variable capacitor such as described in U.S. Patent Publication No. 2015/0194538, filed on Mar. 22, 2015, and titled "Multiple Control Transcap Variable Capacitor." The resonant network 600 is an example of a balanced differential circuit in that it includes two equal branches between the variable reactance element 604 and the output circuit 602 (e.g., C1, R3 and C2, R4). The components C1 and C2, and R3 and R4 are part of the resonant network 600. In a charging solution for a small wearable device, example capacitance values for C1 and C2 may be in the range of 100 picofarads to 100 nanofarads, and the resistance values for R3 and R4 may be in the value of 1 to 100 milliohms. The resonant network 600 may also be referred to as hybrid series and parallel configuration because the total capacitance in the resonant network 600 is based partially on the series capacitors C1 and C2, and partially on the parallel variable reactance element 604. The overall impedance of the resonant network 600, however, may be controlled via the common control terminal on the variable capacitor U1. For example, the operational amplifier 606 may provide a voltage to the control terminal on the variable capacitor U1 to change the capacitive value of the variable capacitor U1. The output of the operational amplifier 606 may be used to tune and detune the resonant network 600 to the below resonance area 510 and the above resonance area 512. For example, the operational amplifier 606 may provide a first control voltage associated with the first capacitance 516 and a second control voltage associated with the second capacitance 518.

Figure 7:
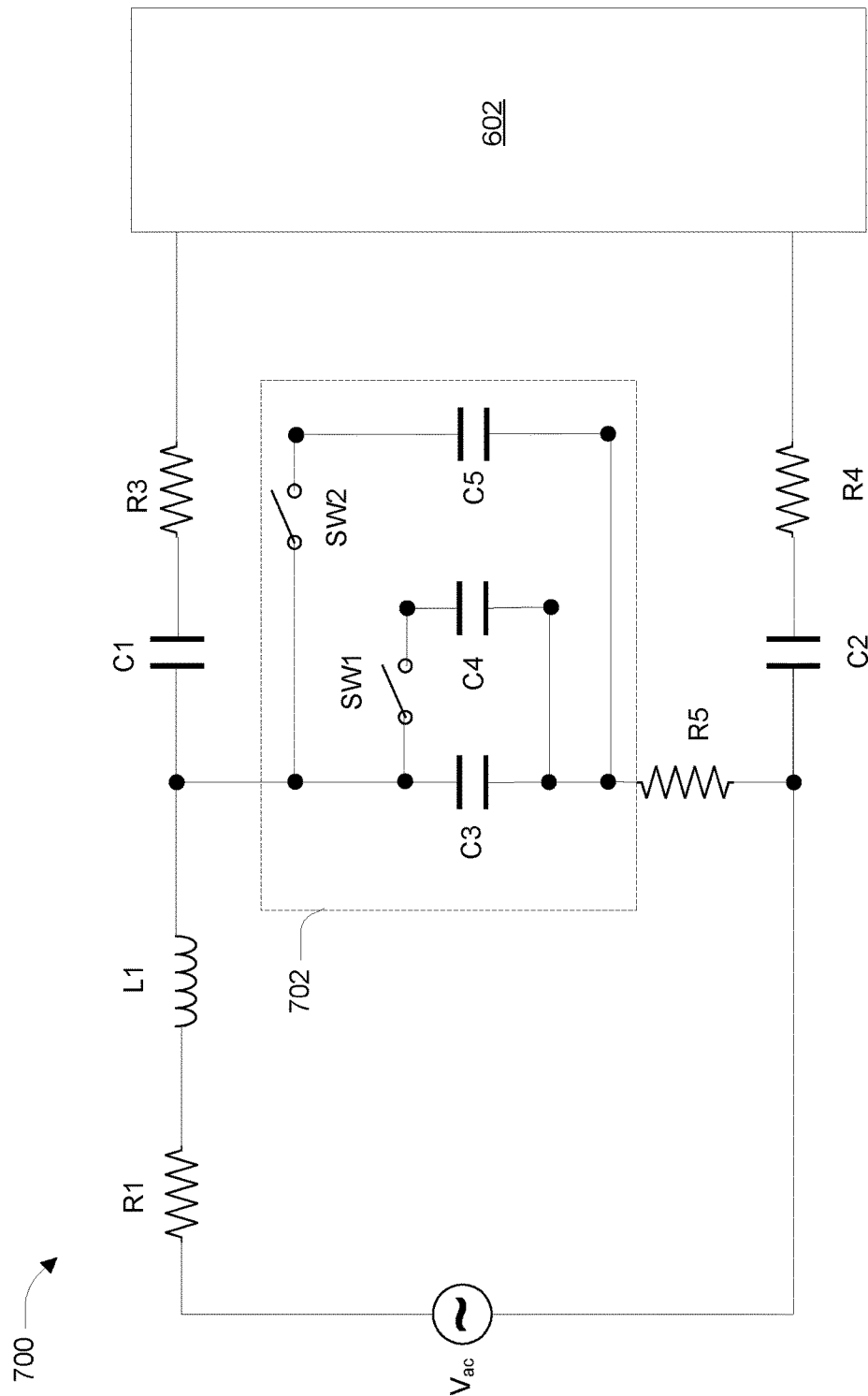
FIG. 7 is a diagram of an example of a resonant network with switched reactance elements.

Referring to FIG. 7, with further references to FIGS. 4-6, an example resonant network 700 with switched reactive elements is shown. The resonant network 700 replaces the variable reactance element 604 described in FIG. 6 with at least one switch such as a plurality of switched reactance elements 702. The plurality of switched capacitors in the switched reactance element 702 includes, as an example, three capacitors in parallel (C3, C4, C5) and two switches (SW1, SW2) as depicted in FIG. 7. Additional capacitors and other switching topologies may also be used. The switches may be operably coupled to the control circuit 408 and configured to open and close to cause the resonant network 700 to operate at least below, above, or at resonance. For example, with both switches open the resonant network may operate in the below resonance area 510. One of the switches may be closed to operate at resonance, and both switches may be closed to operate in the above resonance area 512. The capacitors C3, C4, C5 may be fixed or variable valued components. In an example, one or more of the capacitors C3, C4, C5 may be a variable reactance element 604 (e.g., a transcap, analog variable capacitor technologies, varactors, combinations of varactors, and BST dielectrics/devices). The circuits provided in FIGS. 6 and 7 are exemplary only, and not limitations, as other resonant networks and reactance control topologies may also be used to enable a resonant network to operate on both sides of the output bell curve 506.

Figure 8:
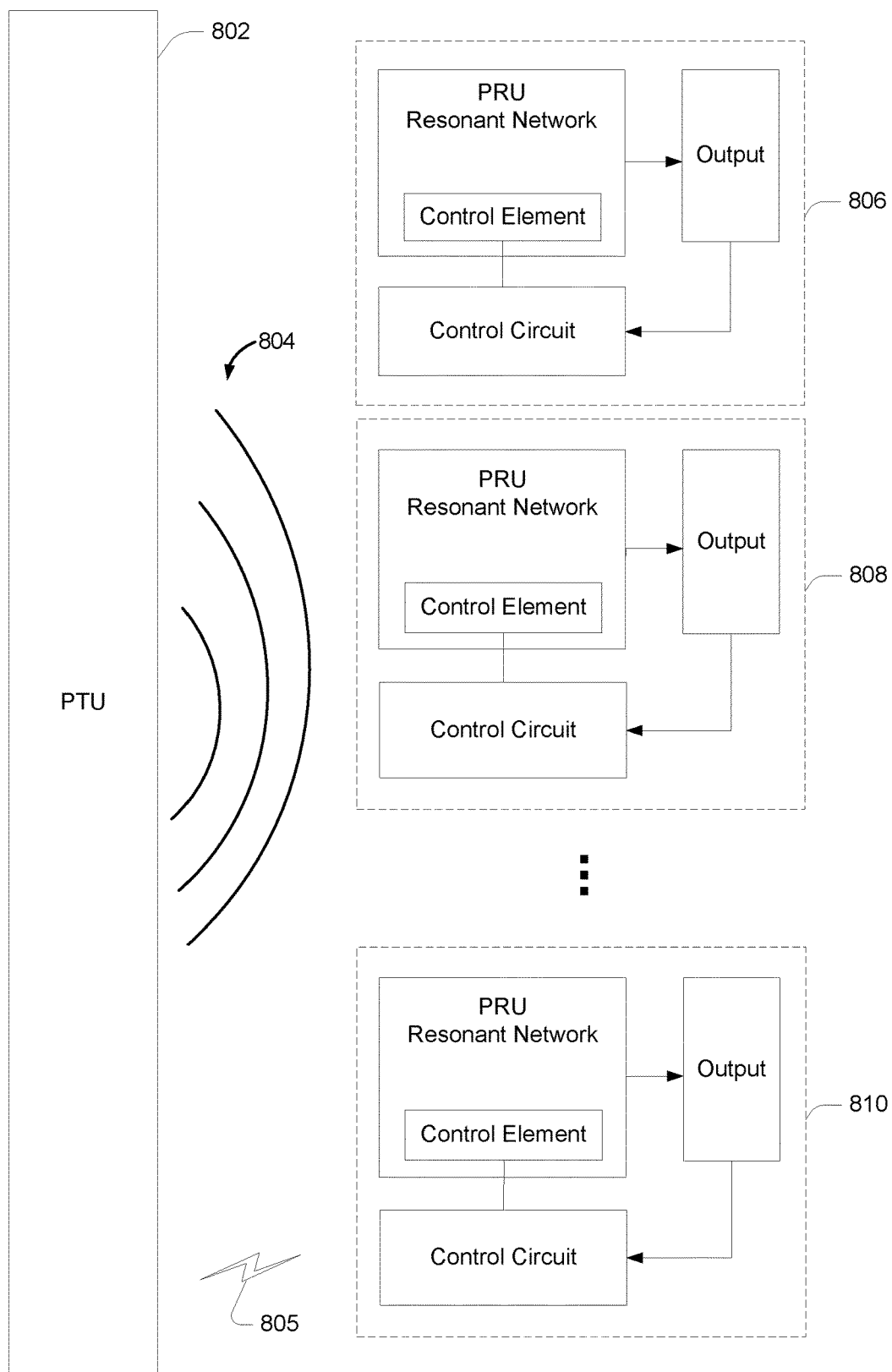
FIG. 8 is a diagram of a wireless power transfer system with multiple power receiving units.

Referring to FIG. 8, with further reference to FIGS. 1-5, a wireless power transfer system with multiple PRUs is shown. The system includes a PTU 802 and a plurality of PRUs 806, 808, 810. The PTU 802 is configured to output a time-varying field 804 (e.g., magnetic or electromagnetic) such as described for the transmit element 214. The PTU 802 may also provide a separate communication channel 805 (e.g., BLUETOOTH, ZIGBEE, cellular, etc.) and is configured to communicate with each of the PRUs. The PTU 802 may be configured to communicate with in-band techniques via the time-varying field 804. The PRUs 806, 808, 810 include a resonant network with a control element, a control circuit and an output as described for the PRU 403 in FIG. 4. During charging operations, the PTU 802 is configured to determine the reflected reactance within the driving circuits (e.g., the amplifier) and evaluate if the level of the reactance is/will exceed design specification. Examples of methods of detecting the change in reactance include comparing the relative phase of the voltage and current within the driving circuits and/or transmitting element, and detecting changes in the zero voltage switching (ZVS) in the class-E amplifier. Other impedance and reflected power measuring techniques may also be used.

In operation, the PTU 802 may signal one or more PRUs 806, 808, 810 to change the operation of the respective resonant network within the PRU to change sides of the output bell curve 506. The instructions may be received via the communication channel 805 or via an in-band signaling techniques (e.g., backscattering). In a system where there are multiple PRUs, each PRU includes an identification number and the PTU may communicate with each PRU individually. The communication protocol may include an additional information element (IE) with a single bit value to instruct the PRU to switch sides and operate on either the left side (i.e., 1=operate in the below resonance area 510), or on the right side (i.e., 0=operate in the above resonance area 512). Other signaling protocols and messaging techniques may also be used to instruct a PRU to change sides (e.g., full data messages or packets, etc.). The respective PRUs are configured to determine the appropriate first capacitance 516 and the second capacitance 518 on the respective left and right side of resonance to realize the desired output 514. In an example, one or more points on the output bell curve 506 may be stored in a memory in the control circuit 408 (i.e., look-up table). The points on the output bell curve 506 correspond to control signals which the control circuit 408 may provide to the control element 409. In an example, the control signal may be an analog voltage (i.e., 0-5V), and the control element may be the operational amplifier 606, or one of the switches SW1, SW2 in FIG. 7. When a PRU receives a switch sides instruction from the PTU, the control circuit 408 is configured to change the reactance in the resonant network from an inductive behavior to a capacitive behavior (or vise-versa) will maintaining the desired output. The PTU may be configured to temporarily cease charging operations to allow the PTU(s) to transition from one side of the output bell curve 506 to the other. A PRU may also reduce the level of its output to a nominal value (e.g., 0-1V) just prior adjusting the reactance, and then restore the output after the reactance is adjusted. In an example, placing an additional PRU in the PTU charging field may trigger the temporary cessation of charging operation to allow one or more of the PRUs to change their reactive behavior (e.g., capacitive to inductive).

In an example, a PRU 403 may switch sides of the output bell curve 506 independent from or in the absence of any signaling from the PTU 402. Referring to FIG. 5, the PRU may determine that the desired output 514 is too low and the corresponding first capacitance 516 is too far away from the resonant capacitance 508. In such an operation state, the inductive reactance as seen by the PTU 402 may exceed the design parameters of the amplifier. In this case, the PRU 403 may be configured to independently switch sides from operating in the below resonance area 510 to operating in the above resonance area 512 to achieve the desired output voltage while reducing the inductive reactance seen by the PTU 402. Multiple PRUs may be configured to exchange operational parameters with one another to determine a total reactance. If the total reactance would exceed the capabilities of the PTU 402, one or more of the PRUs may switch sides of the output bell curve 506 to ensure the PTU 402 can operate within specified parameters.

The values of the components in the resonant networks described herein may vary based on the voltage of operation, technology of the components, and the type of application. For example, the inductance of a resonant network may vary based on size constraints for the application. Small wearable devices such as smart watches, fitness bands, etc. the charging frequency may be around 6.78 MHz and the reactive elements may have values on the order of 20-500 picofarads. Larger applications such as smartphones may require higher values, and even larger applications such as laptops, medical devices, and vehicles may require even larger values.

Figure 9A:
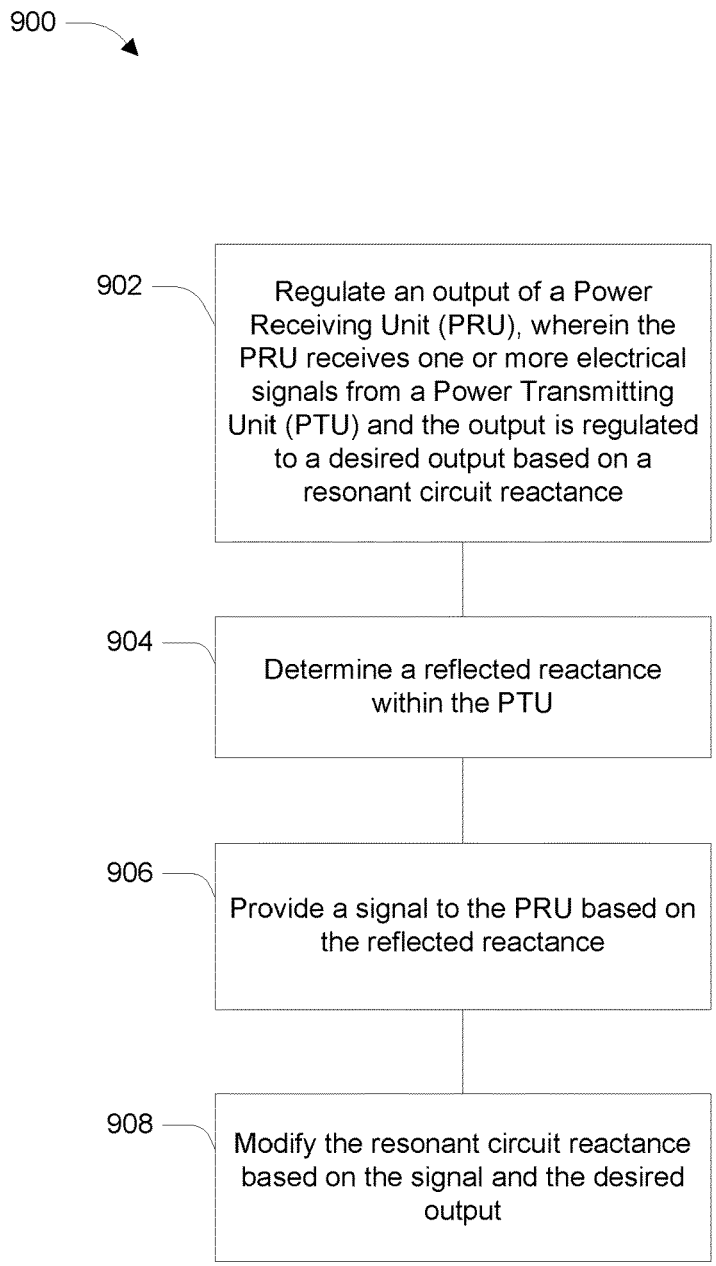
FIG. 9A is a flowchart of an example of a process of regulating an output in a power receiving unit based on a reflective reactance measured at a power transmitting unit.

Referring to FIG. 9A, with further reference to FIGS. 4 and 5, an example of a process 900 of regulating an output in a power receiving unit based on a reflective reactance measured at a power transmitting unit is shown. The process 900 is, however, an example only and not limiting. The process 900 can be altered, e.g., by having stages added, removed, rearranged, combined, performed concurrently, and/or having single stages split into multiple stages.

At stage 902, the control circuit 408 regulates an output of a Power Receiving Unit (PRU), wherein the PRU receives one or more electrical signals from a Power Transmitting Unit (PTU) and the output is regulated to a desired output based on a resonant circuit reactance. The PTU 402 is an example of a wireless power source and may include one or more transmitting elements (i.e., coils) configured to output electrical signals including a time-varying field 405. The PTU 402 also may output an electric signal via a separate communication channel 410. The PRU 403 includes a resonant network 404 and a control circuit 408. The control circuit 408 may include a processor and a memory unit and is configured to provide a control signal to a control element 409 based at least in part on the value of the output 406. The output regulation may be realized by changing the reactance of the resonant network 404 via the control element 409. As an example, the desired output 514 may correspond to the first capacitance 516, and the output may be regulated utilizes capacitive values in the below resonance area 510.

At stage 904, the PTU 402 determines a reflected reactance. The PTU 402 is configured to determine the reactance across the transmitting element, including the reactance reflected from one or more PRUs 403. Measurement methods may include comparing the relative phase of the voltage and current within the driving circuits and/or transmitting element, and detecting changes in the zero voltage switching (ZVS) in the class-E amplifier. Other impedance and reflected power measuring techniques may also be used. The reactance measurement is utilized to determine if the driver circuits (e.g., amplifiers) within the PTU are approaching operational design limits. A high value of reactance will cause the PTU 402 to provide a signal to the PRU 403. For example, the PTU may generate an information element for subsequent transmission via the communication channel 410, or through the time-varying field 405 using in-band communication techniques.

At stage 906, the PTU 402 provides a signal to the PRU 403 based on the reflected reactance. The PTU 402 may generate an information element to instruct the PRU 403 to change the reactance of the resonant circuit from one side of the output bell curve 506 to the other. The signal may be received by the PRU 403 via in-band or out-of-band (e.g., BLUETOOTH) techniques. In an example, the PTU 402 may provide the value of the reflected reactance to the PRU 403 and the control circuit 408 in the PRU 403 is configured to provide a control signal based on the value.

At stage 908, the control circuit 408 modifies the resonant circuit reactance based on the signal and the desired output. The control circuit 408 may include a look-up-table or an equivalent function to describe points on the output bell curve 506. For example, each desired output 514 is associated with two capacitance values such as the first capacitance 516 and the second capacitance 518. The signal provided by the PTU 402 may indicate that the PRU 403 should change operation from the below resonance area 510 to the above resonance area 512. The control circuit 408 then determines the appropriate capacitance level based on the desired output 514. The control circuit 408 provides an appropriate control signal to the control element 409 to modify the resonant circuit reactance to the appropriate value. In an example, the PTU 402 may temporarily halt the time-varying field 405 while the control circuit 408 modifies the value of the capacitive element. Securing the wireless power transfer during the modification may be desired to reduce the potential of damage to the transmitter and receiver circuits. The timing may be coordinated via in-band or out-of-band methods.

Figure 9B:
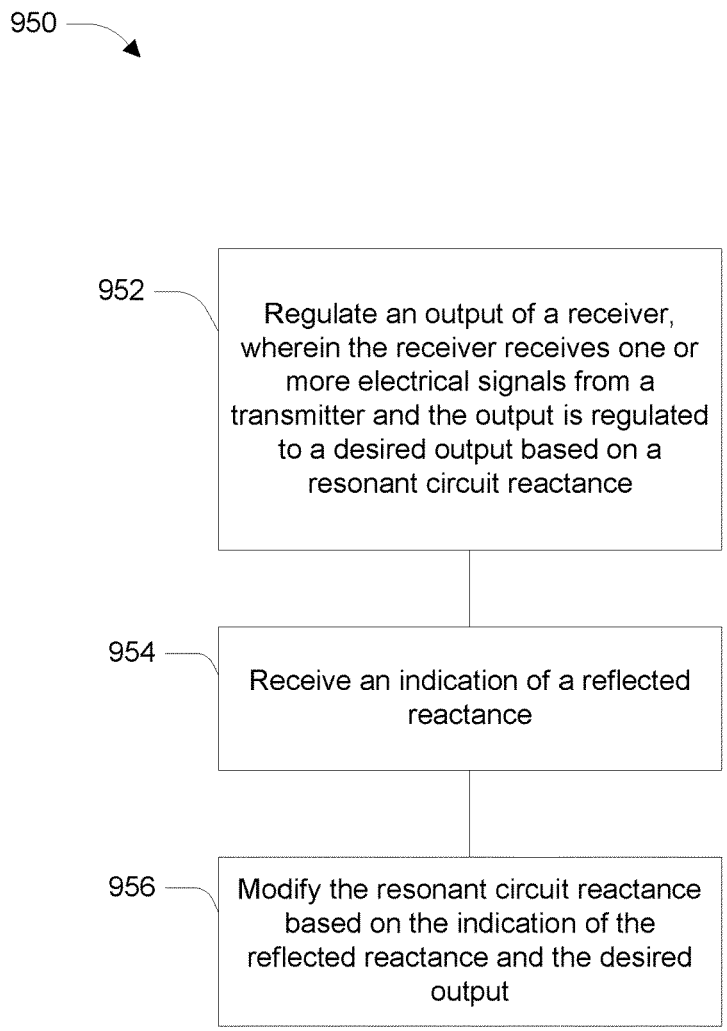
FIG. 9B is a flowchart of an example of a process of regulating an output in a receiver based on a reflective reactance.

Referring to FIG. 9B, with further reference to FIGS. 4 and 5, an example of a process 950 of regulating in a receiver based on a reflective reactance is shown. The process 950 is, however, an example only and not limiting. The process 950 can be altered, e.g., by having stages added, removed, rearranged, combined, performed concurrently, and/or having single stages split into multiple stages.

At stage 952, the control circuit 408 regulates an output of a receiver 208, wherein the receiver 208 receives one or more electrical signals from transmitter and the output is regulated to a desired output based on a resonant circuit reactance. The transmitter is a wireless power source such as a PTU 402 and may include one or more transmitting elements (i.e., coils) configured to output electrical signals including a time-varying field 405. The receiver 208 may include a resonant network 404 and a control circuit 408. The control circuit 408 may include a processor and a memory unit and is configured to provide a control signal to a control element 409 based at least in part on the value of the output 406. The output regulation may be realized by changing the reactance of the resonant network 404 via the control element 409. As an example, the desired output 514 may correspond to the first capacitance 516, and the output may be regulated utilizes capacitive values in the below resonance area 510.

At stage 954, the receiver 208 receives an indication of a reflected reactance. In an example, the reflected reactance is measured in across a transmitting element in the transmitter. Measurement methods may include comparing the relative phase of the voltage and current within the driving circuits and/or transmitting element, and detecting changes in the zero voltage switching (ZVS) in the class-E amplifier. Other impedance and reflected power measuring techniques may also be used. The transmitter may generate an indication of the reflected reactance for transmission to the receiver. For example, the indication of the reflected reactance may an information element (e.g., voltage, carrier frequency, modulated signal, etc.) configured to notify the receiver to change reactance from capacitive to inductive or vice versa. The indication of the reflected reactance may be received via the communication channel 410, or through the time-varying field 405 using in-band communication techniques.

At stage 956, the receiver modifies the resonant circuit reactance based on the indication of the reflected reactance and the desired output. The receiver may include 408 may include a look-up-table or an equivalent function to describe points on the output bell curve 506. Each desired output 514 is associated with two capacitance values such as the first capacitance 516 and the second capacitance 518. The indication of a reflected reactance may indicate that the receiver should change operation from the below resonance area 510 to the above resonance area 512. The control circuit 408 in the receiver may determine an appropriate capacitance level based on the desired output 514. The control circuit 408 provides an appropriate control signal to the control element 409 to modify the resonant circuit reactance to the appropriate value.

Figure 10:
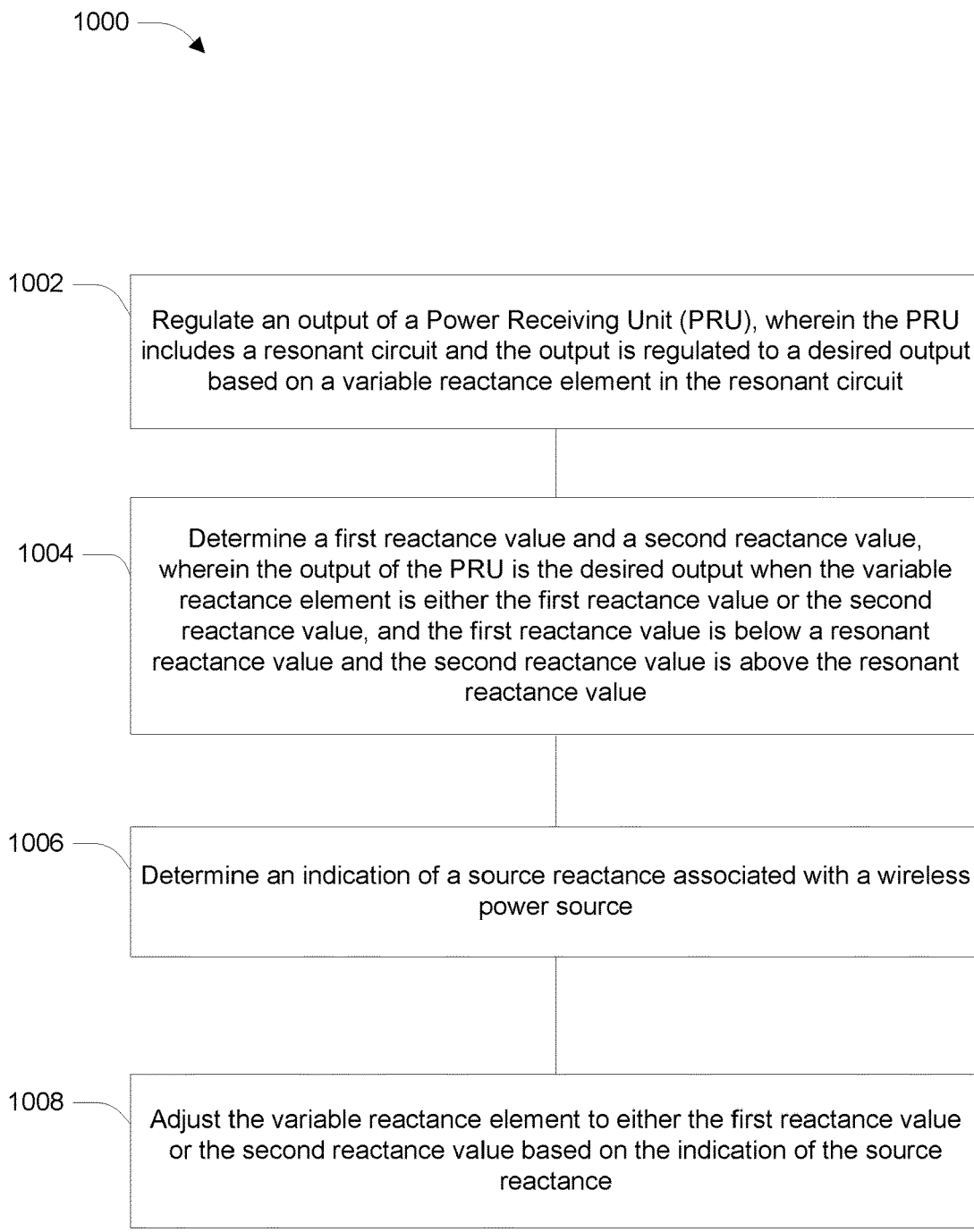
FIG. 10 is a flowchart of an example of a process of regulating an output power based on a variable reactance element.

Referring to FIG. 10, with further reference to FIGS. 4, 5 and 6, an example of a process 1000 of regulating an output power based on a variable reactance element is shown. The process 1000 is, however, an example only and not limiting. The process 1000 can be altered, e.g., by having stages added, removed, rearranged, combined, performed concurrently, and/or having single stages split into multiple stages.

At stage 1002, the control circuit 408 regulates an output of a Power Receiving Unit (PRU), such that the PRU includes a resonant circuit and the output is regulated to a desired output based on a variable reactance element in the resonant circuit. For example, the control circuit 408 is operably coupled to a control element 409 of a variable reactance element 604 in a resonant network 600. The control element may be the operational amplifier 606. Generally the output power of the PRU versus the variable reactance element 604 (e.g., a capacitor) resembles a bell curve where the peak power occurs at resonance. In the case of the resonant network 600, which includes both series and shunt capacitance, output power of the PRU is plotted versus the shunt variable capacitance as depicted in FIG. 5 (i.e., the output bell curve 506). The PRU reactance is zero at resonance, negative for capacitance values below resonance and positive for capacitance values above resonance. The control circuit 408 is configured to regulate the output of the resonant circuit by monitoring the output circuit 602 and adjusting the capacitance of the variable reactance element 604.

At stage 1004, the control circuit 408 determines a first reactance value and a second reactance value, such that the output of the PRU is the desired output when the variable reactance element is either the first reactance value or the second reactance value and the first reactance value is below a resonant reactance value and the second reactance value is above the resonant reactance value. The control circuit 408 may include a look-up-table (or other data structure), or a function associated with the output bell curve 506. For example, the desired output 514 may be associated with the first capacitance 516 and the second capacitance 518. As depicted in FIG. 5, the first capacitance 516 is below a resonance reactance value (i.e., the resonant capacitance 508) and the second capacitance 518 is above the resonant reactance value. The first capacitance value may be a value in the below resonance area 510 and the second capacitance value may be a value in the above resonance area 512 based on the desired output.

At stage 1006, the control circuit 408 determines an indication of a source reactance associated with a wireless power source. The indication of the source reactance may be determined via a signal received from the PTU 402. For example, the PTU 402 is an example of a wireless power source and may detect an increase in the reflected reactance within the transmitter driver circuits (e.g., via voltage/current phase, ZVS response, etc.) and then send a signal to the PRU 403 via the communication channel 410 or an in-band method with the time-varying field 405. In an example, the communication channel 410 may be a BLUETOOTH communication and include one or more information elements to indicate the level of the reflected reactance, or any indication that the PRU 403 should change reactance to the other side of the bell curve. In an embodiment, the PRU 403 may determine the indication of a source reactance independent of a signal from the PTU 402. For example, the PRU 403 may include a reactance measuring circuit configured to measure its own internal reactance and determine the indication of the source reactance. The PRU 403 may query one or more look-up-tables (or other data structures) to correlate output power with an indication of source reactance. Multiple PRUs on a charging pad (i.e., PTU) may be configured to communicate with one another to exchange reactance level information and collectively determine if the reactance of one or more the PTUs should be modified.

At stage 1008, the control circuit 408 adjusts the variable reactance element to either the first reactance value or the second reactance value based on the indication of the source reactance. The control circuit 408 may send a control signal to the control element 409 in the resonant network 404. In an example, referring to FIG. 6, the impedance of the resonant network 600 may be controlled via the common control terminal on the variable capacitor U1. The control circuit 408 may provide a voltage to the operational amplifier 606, which then may provide a voltage to a control terminal on the variable capacitor U1 to change the capacitive value of the variable capacitor U1. The output of the operational amplifier 606 may be used to cause the resonant network 600 to change sides of the bell curve (e.g., operate in the below resonance area 510 or the above resonance area 512). The operational amplifier 606 may provide a first control voltage associated with the first capacitance 516 and a second control voltage associated with the second capacitance 518. In another example, referring to FIG. 7, the control circuit 408 may be operably coupled to a plurality of switched capacitors (e.g., the two switches SW1, SW2). Other capacitor switching topologies may also be used. The switches are configured to open and close to cause the resonant network 700 to operate at least below, above, or at resonance. For example, with both switches SW1, SW2 open the resonant network may operate in the below resonance area 510. One of the switches SW1, SW2 may be closed to operate at resonance, and both switches SW1, SW2 may be closed to operate in the above resonance area 512. Other resonant circuits may include fixed and variable capacitors and the variable reactance element may include combinations of reactive components. The circuits provided in FIGS. 6 and 7 are exemplary only, and not limitations, as other resonant networks and reactance control topologies may also be used to adjust a resonant network to operate on either side of the output bell curve 506.

In an embodiment, the PRU 403 may utilize the sides of the output bell curve 506 to generate a binary signal for the PTU 402. For example, the control circuit 408 may receive a communication signal and adjust the reactance of the resonant network 404 from the below resonance area 510 to the above resonance area 512 based on the communication signal. The change in the reactance in the resonant network 404 from one side of the output bell curve 506 to the other side would maintain the same output voltage (e.g., $V_1$ 514) and effectively modulate the reflected reactance in the PTU 402. The corresponding values of the reflected reactance in the PTU 402 may be interpreted as a binary 0 or a binary 1 respectively. Using the change in the reactance in the resonant network 404 to communicate with the PTU 402 may enable a secure form of communication that would be difficult to detect.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium," "computer-readable medium," and "non-transitory processor-readable storage medium" as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. An apparatus for providing a desired output from a power receiving unit in a wireless power transfer system, comprising:
a resonant network including a variable reactance element, wherein the resonant network is configured to resonate when the variable reactance element is at a resonant reactance value;
a control circuit operably coupled to the variable reactance element and configured to:
determine a first reactance value and a second reactance value, wherein an output of the power receiving unit is the desired output when the variable reactance element is either the first reactance value or the second reactance value, and the first reactance value is below the resonant reactance value and the second reactance value is above the resonant reactance value;
determine an indication of a source reactance associated with a wireless power source; and
adjust the variable reactance element to either the first reactance value or the second reactance value based on the indication of the source reactance.

2. The apparatus of claim 1 wherein the control circuit is configured to receive an information element from the wireless power source and to determine the indication of the source reactance based on the information element.

3. The apparatus of claim 2 wherein the information element is a single bit.

4. The apparatus of claim 1 wherein the control circuit includes a look-up-table to determine the indication of the source reactance.

5. The apparatus of claim 1 further comprising a reactance measuring circuit configured to determine the indication of the source reactance.

6. The apparatus of claim 1 wherein the variable reactance element includes at least one variable capacitor.

7. The apparatus of claim 1 wherein the variable reactance element includes a plurality of capacitors and at least one switch operably coupled to the control circuit.

8. The apparatus of claim 1 wherein the control circuit is configured to receive a communication signal and adjust the variable reactance element to either the first reactance value or the second reactance value based on the communication signal.

9. The apparatus of claim 1 wherein the power receiving unit comprises at least one coil configured to inductively couple power via a magnetic field.

10. The apparatus of claim 1 wherein the resonant network is capacitive when the variable reactance element is at the first reactance value.

11. The apparatus of claim 1 wherein the resonant network is inductive when the variable reactance element is at the second reactance value.

12. The apparatus of claim 1 wherein the indication of the source reactance indicates a reflected reactance measured in the wireless power source is inductive and the control circuit is configured to adjust the variable reactance element to the second reactance value.

13. The apparatus of claim 1 wherein the indication of the source reactance indicates a reflected reactance measured in the wireless power source is capacitive and the control circuit is configured to adjust the variable reactance element to the first reactance value.

14. A method of reducing reflected reactance in a wireless power transfer system, comprising:
regulating an output of a power receiving unit, wherein the power receiving unit includes a resonant circuit and the output is regulated to a desired output based on a variable reactance element in the resonant circuit;
determining a first reactance value and a second reactance value, wherein the output of the power receiving unit is the desired output when the variable reactance element is either the first reactance value or the second reactance value, and the first reactance value is below a resonant reactance value and the second reactance value is above the resonant reactance value;
determining an indication of a source reactance associated with a wireless power source; and
adjusting the variable reactance element to either the first reactance value or the second reactance value based on the indication of the source reactance.

15. The method of claim 14 further comprising receiving an information element from the wireless power source and determining the indication of the source reactance based on the information element.

16. The method of claim 15 wherein the information element is a single bit.

17. The method of claim 14 wherein determining the indication of the source reactance includes querying a look-up-table.

18. The method of claim 14 wherein determining the indication of the source reactance includes measuring a reactance of the resonant circuit with a reactance measuring circuit.

19. The method of claim 14 wherein adjusting the variable reactance element includes providing a control signal to at least one variable capacitor.

20. The method of claim 14 wherein adjusting the variable reactance element includes providing a control signal to at least one switch operably coupled to a plurality of capacitors in the resonant circuit.

21. The method of claim 14 further comprising reducing the output of the power receiving unit to a nominal value prior to adjusting the variable reactance element.

22. The method of claim 14 further comprising receiving a communication signal and adjusting the variable reactance element to either the first reactance value or the second reactance value based on the communication signal.

23. The method of claim 14 wherein the resonant circuit is capacitive when the variable reactance element is at the first reactance value.

24. The method of claim 14 wherein the resonant circuit is inductive when the variable reactance element is at the second reactance value.

25. The method of claim 14 further comprising:
  determining that the indication of the source reactance indicates a reflected reactance measured in the wireless power source is inductive; and
  adjusting the variable reactance element to the second reactance value.

26. The method of claim 14 further comprising:
  determining that the indication of the source reactance indicates a reflected reactance measured in the wireless power source is capacitive; and
  adjusting the variable reactance element to the first reactance value.

27. An apparatus for reducing reflected reactance in a wireless power transfer system, comprising:
  means for varying a reactance of a power receiving unit,
  means for determining a first reactance value and a second reactance value, wherein an output of the power receiving unit is a desired output when the reactance of the power receiving unit is either the first reactance value or the second reactance value, and the first reactance value is below a resonant reactance value and the second reactance value is above the resonant reactance value;
  means for determining an indication of a source reactance associated with a wireless power source; and
  means for adjusting the reactance of the power receiving unit to either the first reactance value or the second reactance value based on the indication of the source reactance.

28. A non-transitory processor-readable storage medium comprising processor-readable instructions configured to cause at least one processor to reduce reflected reactance in a wireless power transfer system, comprising:
  code for regulating an output of a power receiving unit, wherein the power receiving unit includes a resonant circuit and the output is regulated to a desired output based on a variable reactance element in the resonant circuit;
  code for determining a first reactance value and a second reactance value, wherein the output of the power receiving unit is the desired output when the variable reactance element is either the first reactance value or the second reactance value, and the first reactance value is below a resonant reactance value and the second reactance value is above the resonant reactance value;
  code for determining an indication of a source reactance associated with a wireless power source; and
  code for adjusting the variable reactance element to either the first reactance value or the second reactance value based on the indication of the source reactance.

29. The storage medium of claim 28 further comprising code for receiving an information element from a power transmitting unit and code for determining the indication of the source reactance based on the information element.

30. The storage medium of claim 28 wherein the code for adjusting the variable reactance element includes code for providing a control signal to at least one variable capacitor.

* * * * *